US012159475B2

(12) United States Patent
Dey et al.

(10) Patent No.: US 12,159,475 B2
(45) Date of Patent: Dec. 3, 2024

(54) HANDWRITING RECOGNITION

(71) Applicant: Ancestry.com Operations Inc., Lehi, UT (US)

(72) Inventors: Raunak Dey, Lehi, UT (US); Gopalkrishna Balkrishna Veni, Lehi, UT (US); Masaki Stanley Fujimoto, Provo, UT (US); Yen-Yun Yu, Murray, UT (US); Jinsol Lee, Lehi, UT (US)

(73) Assignee: Ancestry.com Operations Inc., Lehi, UT (US)

( * ) Notice: Subject to any disclaimer, the term of this patent is extended or adjusted under 35 U.S.C. 154(b) by 388 days.

(21) Appl. No.: 17/643,545

(22) Filed: Dec. 9, 2021

(65) Prior Publication Data

US 2022/0189188 A1    Jun. 16, 2022

Related U.S. Application Data

(60) Provisional application No. 63/124,316, filed on Dec. 11, 2020.

(51) Int. Cl.
*G06V 30/226*    (2022.01)
*G06F 18/21*    (2023.01)
(Continued)

(52) U.S. Cl.
CPC .......... *G06V 30/226* (2022.01); *G06F 18/214* (2023.01); *G06F 18/217* (2023.01); *G06N 3/045* (2023.01); *G06V 10/82* (2022.01)

(58) Field of Classification Search
CPC .......... G06N 3/045; G06N 3/044; G06N 3/08; G06N 3/084; G06N 3/048; G06N 3/04;
(Continued)

(56) References Cited

U.S. PATENT DOCUMENTS

2007/0009151 A1\* 1/2007 Pittman ................ G06V 30/373
382/159
2018/0137349 A1\* 5/2018 Such .................... G06V 30/414
(Continued)

OTHER PUBLICATIONS

International Search Report and Written Opinion for PCT/US2021/062609 mailed Mar. 25, 2022, all pages.
(Continued)

*Primary Examiner* — Ian L Lemieux
*Assistant Examiner* — Woo C Rhim
(74) *Attorney, Agent, or Firm* — Keller Preece PLLC

(57) ABSTRACT

A simplified handwriting recognition approach includes a first network comprising convolutional neural network comprising one or more convolutional layers and one or more max-pooling layers. The first network receives an input image of handwriting and outputs an embedding based thereon. A second network comprises a network of cascaded convolutional layers including one or more subnetworks configured to receive an embedding of a handwriting image and output one or more character predictions. The subnetworks are configured to downsample and flatten the embedding to a feature map and then a vector before passing the vector to a dense neural network for character prediction. Certain subnetworks are configured to concatenate an input embedding with an upsampled version of the feature map.

20 Claims, 4 Drawing Sheets

Burgess, Grady

12

14

10

(51) Int. Cl.
*G06F 18/214* (2023.01)
*G06N 3/045* (2023.01)
*G06V 10/82* (2022.01)

(58) Field of Classification Search
CPC .......... G06N 20/00; G06N 3/02; G06N 20/20; G06V 30/10; G06V 10/82; G06V 30/153; G06V 30/19173; G06V 30/36; G06V 30/413; G06V 30/18057; G06V 30/333; G06V 30/40; G06V 30/414; G06V 30/226; G06V 10/454; G06V 10/40; G06V 10/44; G06V 30/18; G06F 40/10; G06F 40/30; G06F 18/214; G06F 18/217; G06T 2207/20084; G06T 2207/20081; G06T 7/11; G06T 2207/20021; G06T 2207/30176
See application file for complete search history.

(56) References Cited

U.S. PATENT DOCUMENTS

| | | | | |
|---|---|---|---|---|
| 2019/0087677 | A1* | 3/2019 | Wolf | G06V 30/226 |
| 2019/0095753 | A1* | 3/2019 | Wolf | G06F 18/21 |
| 2019/0180154 | A1* | 6/2019 | Orlov | G06F 40/289 |
| 2020/0026951 | A1* | 1/2020 | Chowdhury | G06F 18/217 |
| 2020/0104635 | A1* | 4/2020 | Xu | G06V 30/19147 |
| 2020/0242825 | A1* | 7/2020 | Kim | G06F 18/00 |
| 2021/0034850 | A1* | 2/2021 | Such | G06V 30/414 |
| 2021/0303901 | A1* | 9/2021 | Wei | G06V 20/62 |
| 2021/0357674 | A1* | 11/2021 | Ogawa | G06F 18/213 |
| 2021/0374455 | A1* | 12/2021 | Ghosh | G06V 30/413 |
| 2022/0164533 | A1* | 5/2022 | Anisimovich | G06V 10/771 |
| 2022/0164589 | A1* | 5/2022 | Upshinskii | G06N 3/045 |
| 2023/0245483 | A1* | 8/2023 | Zhang | G06V 30/1831 382/157 |
| 2024/0037969 | A1* | 2/2024 | Upshinskii | G06F 18/24137 |

OTHER PUBLICATIONS

Karimi Mostafa et al., "Illegible Text to Readable Text: An Image-to-Image Transformation using Conditional Sliced Wasserstein Adversarial Networks," 2020 IEEE/CVF Conference on Computer Vision and Pattern Recognitin Workshops (CVPRW), IEEE, Jun. 14, 2020, pp. 2353-2361, XP033798915, DOI: 10.1109/CVPRW50498.2020.00284 [retrieved on Jul. 27, 2020] p. 2357, left-hand column, paragraph 1; figure 1b.
Rawls Stephen et al: "Combining Convolutional Neural Networks and LSTMs for Segmentation-Free OCR," 2017 14$^{th}$ IAPR International Conference on Document Analysis and Recognition (ICDAR), IEEE, vol. 1, Nov. 9, 2017, pp. 155-160, XP033307756, DOI: 10.1109/ICDAR.2017.34 [retrieved on Jan. 25, 2018] p. 156, left-hand column, paragraph 4; figures 1, 2 p. 157, right-hand column, paragraph 4; table II.
G. Maillett de Buy Wenniger et al., "No Padding Please: Efficient Neural Handwriting Recognition," 2019 International Conference on Document Analysis and Recognition (ICDAR), Sydney, Australia, 2019, pp. 355-362, doi: 10.1109/ICDAR.209.00064. https://ieeexplore.ieee.org/abstract/document/8978156?casa_token=fp4LAw3XgAeAAAAA.Uxila5lgQkWlo0wAgtVEV1QSPZIp13nFkLt_ew3Xy4lmOVEyL4Xp4CunT__xhx3P7Ct4hink.
B. Stuner et al., "Handwriting recognition using cohort of LSTM and lexicon verification with extremely large lexicon," Multimed Tools Appl (2020). https://doi.org/10.1007/s11042-020-09198-6.
V. Carbune et al., "Fast multi-language LSTM-based online handwriting recognition," arXiv:1902.10525v2 [cs.CL] Jan. 24, 2020 https://arxiv.org/abs/1902.10525.
L. Kang et al., "Pay Attention to What You Read: Non-recurrent Handwritten Text-Line Recognition," arXiv:2005.13044v1 [cs.CV] May 26, 2020 https://arxiv.org/abs/2005.13044.
Y. Zhu et al., "Text Recognition in Images Based on Transformer with Hierarchical Attention," 2019 IEEE International Conference on Image Processing (ICIP), Taipei, Taiwan, 2019, pp. 1945-1949, doi: 10.1109/ICIP.2019.8803203. https://ieeexplore.iees.org/abstract/document/8803203?casa_token=KGOWSXkeyNcAAAAA:rN7UugkQk6ydJSLn-gmmTBSaWn_uk7MIWzTI3Kc9KVq5l8pwRucSKNCKsaXDo_zlWdLIZbx.
Doermann, Handbook of Document Image Processing and Recognition, Springer, 2014.
Goldberg, Neural Network Methods in Natural Language Processing, Morgan & Claypool, 2017.
Graves, Supervised Sequence Labelling with Recurrent Neural Networks, Springer, 2012.
Hemanth, Deep learning for image processing applications, IOS, 2017.

* cited by examiner

HANDWRITING RECOGNITION

CROSS-REFERENCES TO RELATED APPLICATION

The present application claims the benefit of U.S. Provisional Patent Application No. 63/124,316, filed on Dec. 11, 2020, which is hereby incorporated by reference in its entirety.

FIELD

The disclosed embodiments relate to systems, methods, and/or computer-program products configured for handwriting recognition.

BACKGROUND OF THE INVENTION

Text contained in records, documents, images, and other text-based and text-containing sources is an invaluable source of information that historically has been extracted and interpreted manually at great time and cost and with tremendous amounts of human error. Automatic recognition of such text has been attempted using modalities such as optical character recognition ("OCR"), layout analysis, text segmentation, and handwriting recognition approaches, but these are beset by challenges such as varying noise conditions, interfering annotations, typical record artifacts like fading and vanishing texts, variations in handwriting, and digitization issues, all of which make text difficult to accurately transcribe. While OCR approaches have become successful at recognizing machine-generated text, these approaches are far less successful at recognizing and extracting handwritten text due to the aforementioned challenges compounded by the difficulty of connecting characters in text, in contrast to machine-generated text in which characters are easily separable.

Family history research is an increasingly popular area of interest for text recognition. Conducting family history research often entails inspecting historical handwritten records, of which some family history research services and platforms have large collections. An example of such records is handwritten Census records. However, due to the vast scale of such records, manual transcription of such records, which is inherently laborious and costly, is simply not feasible.

Transcription is even more difficult in the case of historical records due to the often-degraded condition of the records (due to the passage of time), errors specific to the digitization and/or storage of the records, the vagaries of language which changes over time, the different styles of handwriting used by historical recordkeepers, spelling errors, the choice of abbreviations and acronyms by different enumerators, and other factors.

There is a need for automated handwriting recognition tools to democratize the valuable information contained in historical records and other records, documents, images, etc. without the immense cost and complexity of manual transcription. Existing handwriting recognition models leave much to be desired in terms of accuracy and robustness, particularly those attempts that have been made at transcribing historical records.

For example, existing handwriting recognition solutions mostly rely on deep neural networks comprising a pipeline of models. Convolutional neural networks ("CNNs") are used first to extract features or feature maps from given images of handwritten words; attention-based architectures (i.e., transformers) or temporal sequence-based architectures (e.g. recurrent neural networks ("RNNs") and/or long-short term memory networks ("LSTMs")) are used next to process features sequentially; then a decoding system, e.g. a connectionist temporal classification ("CTC") model, is used to predict characters (known as "dense neural networks").

Such approaches are often categorized into three classes. One class uses a classification-based model to classify the handwritten text to a predefined class, for example assigning numbers to one of ten classes from 0 to 9, or classifying information in job descriptions to a limited number of available jobs and mapping the inputting images of the text to one of those classes. Another class involves using a sequential model to read, character by character, a time-distributed neural network, and generating the text from handwritten documents. Another involves using an encoder-decoder architecture, i.e., transformers.

Some widely used handwriting recognition systems include CNNRNNCTC and CNN-Transformer-CTC and variants thereof. Considering a variant of the model that uses word beam search ("WBS") during its decoding phase, CNNRNNCTC utilizes some knowledge of language to check for a word completion given a predicted sequence of characters at each time stamp. However, the model is limited to the vocabulary the model is aware of and is not robust to spelling errors or incorrectly recognized character sequences. Given the commonness of spelling errors and new words, such as slang or uncommon names, terms, or acronyms, in many handwritten contexts, this weakness compromises the results for many, if not most, applications of handwriting recognition tools.

CNNRNNCTC and related models are inherently complex, with numerous parameters involved in training. Transformers often require alignment and preprocessing, requiring that images for handwriting recognition be split into two groups. Additionally, LSTM- or transformer-based methods often require additional augmentation schemes (including, e.g., masking, resizing of textual information for alignment, etc.), which requires substantial input from a user. LSTM- and transformer-based methods further require a complex loss, such as CTC, for best results, requiring a complex decoding scheme and increasing inference time.

Handwriting recognition on Census record images, for example, involves transcribing index values corresponding to various fields that are broadly classified into four categories including numerical (numbers), small category (fewer than 25 classes), large category (greater than 25 classes), and alpha-numerical (indefinite classes). While existing deep-learning classification models have been implemented with some success on numerical and small categories, the existing approaches fall short on large categories and alpha-numeric fields due to the nature and complexity of the task of transcribing handwriting in such fields.

Rule-based approaches to solving the problem of large category classification, like defining and grouping field values, such as job titles and job descriptions, are both labor intensive and thus expensive as well as limited by the inherent inaccuracies in source field values. For example, when attempting to categorize job titles for Census handwriting recognition, the use by original Census enumerators of informal descriptions rather than job titles, spelling errors, and multiple ways of describing the same occupation propagate through the results which complicates attempts to efficiently and accurately interpret the handwriting. The same challenges apply to name and address fields, number fields, and others.

Handwriting recognition models thus suffer from their inability to account for the nuances of language, which limits their robustness. As a result, such models often produce absurd outputs and are limited in their applicability. In view of the foregoing, there is a need for an improved system, method, and/or computer-program product for handwriting recognition.

BRIEF SUMMARY OF THE INVENTION

The handwriting recognition system, method, and computer program product embodiments of the present disclosure advantageously address the problems in the art by providing a simplified, efficient, and accurate handwriting recognition modality with improved accuracy. The handwriting recognition embodiments advantageously reduce the cost and complexity of training and utilizing a handwriting recognition modality while improving results compared to existing approaches. The handwriting recognition embodiments of the disclosure provide a simplified handwriting recognition approach that foregoes the second step of existing approaches—i.e. the attention and time-distributed analysis (LSTM with attention) or attention and dedicated decoder schemes (transformers)—reducing the number of parameters, speeding up the training process, minimizing user input, and achieving improved results relative to existing approaches.

A handwriting recognition embodiment may include a first network formed or functioning as or similar to a CNN, in embodiments with one or more pooling layers such as max pooling layers, configured to cooperate in embodiments with a cascade of concatenated convolution layers and dense layers, e.g. dense neural network ("NN") layers. The CNN may have any suitable number of layers, in embodiments 14 layers. The length of the cascade may be dependent on the maximum word size pertaining to the inferred field, e.g. handwritten historical records like censuses. The convolution layers may be configured to act as or generate feature maps. In an embodiment, a max pooling layer is interlaced after every two convolution layers to reduce computation costs and avoid overfitting. Each convolution layer of the CNN may be followed by a rectified linear unit (ReLU) as an activation function and a batch normalization layer.

An output of the CNN may be fed, in an embodiment, to the cascade of concatenated convolution layers and dense NN layers. In other embodiments, the input to the cascade of concatenated convolution layers and dense NN layers is generated by architectural changes (e.g. editing a number of convolutional and pooling layers), representational learning techniques such as neural networks, including autoencoders and transformers, dimensionality reduction methods, a combination of low-level computer-vision-based feature extraction techniques, variations and/or modifications thereof, or otherwise.

The cascade of concatenated convolution layers may have a number of layers corresponding to the maximum desired number of characters in a word. In an embodiment, there are 24 layers corresponding to 24 characters in a word. In other embodiments, any other number of layers may be chosen.

Along each timestep or layer of the cascaded NN layers, a subnetwork may be arranged to output a character prediction for a corresponding timestep. In an embodiment, an input to each subnetwork is an embedding, such as a 256×8×8 embedding of an input image, the embedding produced in embodiments by the CNN network or any other upstream source. The second input to each subnetwork, except in embodiments for the first timestep, is an upsampled version of a single activation-mapped convolution layer or feature map calculated during the previous timestep. This can be done by passing the single activation-mapped convolution layer having, in embodiments, dimensions of 1×8×8, through a convolution layer resulting in, e.g., 256 activation maps or dimensions of 256×8×8.

Within the subnetwork(s), the first and second inputs may be concatenated, downsampled, flattened, and/or passed through a dense neural network comprising one or more sigmoids. In a downsampling module or step, an embedding, e.g. a 256×8×8 embedding received from the first network, may be compressed to a 1×8×8 feature map using a suitable modality therefor. In a flattening module or step, the 1×8×8 feature map may be converted to, e.g., a 64-element vector suitable for feeding, as input, to the dense neural network.

In embodiments, the dense neural network may comprise 29 sigmoids corresponding to the number of characters in an alphabet, for example 26 letters plus three special characters. To predict a character at the first timestep, no concatenation step is required as the embeddings may be passed directly to the downsampling stage.

The dense neural network may be a single-layer neural network configured to determine a probability of which character is represented at a particular timestep. That is, the dense neural network may determine a probability that the received embedding corresponds to each possible character, i.e. each of the 29 sigmoids, and then output the highest probability, e.g. "a" or "m." Any suitable dense neural network, such as A handwriting recognition modality according to the embodiments may be trained by providing a set of training images along with corresponding manual labels through a network as described herein, during which the network learns patterns in the training set comprising images of various word-sized words and outputs characters which are compared against the ground truth.

The handwriting recognition approach of the disclosure advantageously avoids the use of time-distributed elements which reduces the number of parameters to be trained and reduces memory and processing requirements. The handwriting recognition approach of the disclosed embodiments is faster than existing transformer- or LSTM-based methods due to the omission of complex components, yet performs better than transformer- and LSTM-based methods without the need for alignment or augmentation of the input image. The approach is further easy to scale based on inputs and requires no complex decoding scheme.

These and other features of the present disclosure will become better understood regarding the following description, appended claims, and accompanying drawings.

Figure 1:
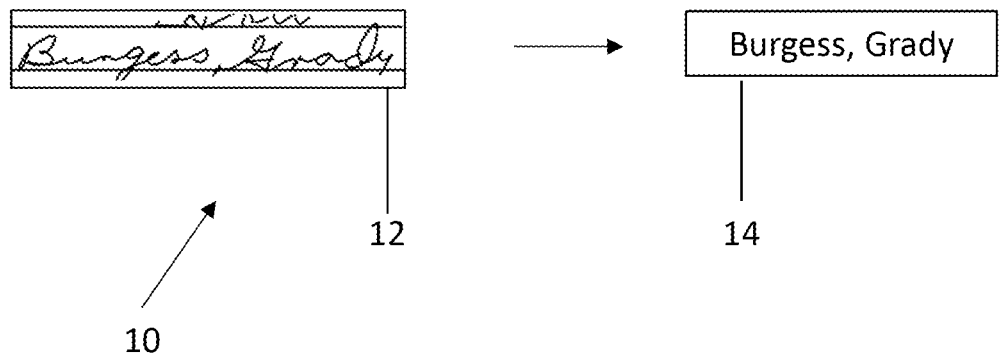
FIG. 1 illustrates an input handwriting image for and an output handwriting detection from a handwriting recognition model according to an embodiment of the disclosure.

The drawing figures are not necessarily drawn to scale, but instead are drawn to provide a better understanding of the components, and are not intended to be limiting in scope, but to provide exemplary illustrations. The drawing figures, which are included to provide a further understanding of the disclosure, are incorporated in and constitute a part of this specification, illustrate embodiments of the disclosure and together with the detailed description serve to explain the principles of the disclosure.

No attempt is made to show structural details of the disclosure in more detail than may be necessary for a fundamental understanding of the disclosure and various ways in which it may be practiced. The figures illustrate exemplary configurations of systems and methods for handwriting recognition, and in no way limit the structures, configurations, or functions of systems, methods, and computer program products for handwriting recognition, and components thereof, according to the present disclosure.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE INVENTION

A. Introduction

Although the embodiments of the disclosure are adapted for providing systems and methods for handwriting recognition, it will be appreciated that the principles of the disclosure may be adapted to any suitable application of text recognition, genealogical and/or genetic research, exploration, organization, and/or visualization.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

A better understanding of different embodiments of the disclosure may be had from the following description read with the accompanying drawings in which like reference characters refer to like elements. While the disclosure is susceptible to various modifications and alternative constructions, certain illustrative embodiments are in the drawings and are described below. It should be understood, however, there is no intention to limit the disclosure to the embodiments disclosed, but on the contrary, the intention covers all modifications, alternative constructions, combinations, and equivalents falling within the spirit and scope of the disclosure. Unless a term is defined in this disclosure to possess a described meaning, there is no intent to limit the meaning of such term, either expressly or indirectly, beyond its plain or ordinary meaning.

Reference characters are provided in the claims for explanatory purposes only and are not intended to limit the scope of the claims or restrict each claim limitation to the element in the drawings and identified by the reference character.

For ease of understanding the disclosed embodiments of systems and methods for handwriting recognition, certain modules and features are described independently. The modules and features may be synergistically combined in embodiments to provide a handwriting recognition system, method, and/or computer-program product.

The figures (FIGs.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed handwriting recognition systems (or methods) for purposes of illustration only. One skilled in the art will readily recognize from the following description that alternative embodiments of the structures and methods illustrated herein may be employed without departing from the principles described herein.

B. Embodiments of Handwriting Recognition Systems and Methods

Embodiments of handwriting recognition systems and methods address shortcomings in the art by providing a simplified and accurate handwriting recognition approach that advantageously achieves better than start-of-the-art results while having fewer parameters and complex components.

FIG. 1 shows a comparison 10 between an example input image 12 and an output 14. The input image 12 comprises handwriting, for example a handwritten name that may be found in a Census document or other historical record or digitization of the same. An example output 14 is shown, wherein the characters in the input image 12 have been predicted and outputted. That is, the handwriting recognition embodiments of the disclosure are configured to determine that the handwritten name is Burgess, Grady. While Census documents and other historical documents are described, it will be appreciated that any suitable handwriting samples from any suitable sources may be processed using the embodiments of the disclosure. Further, the embodiments of the disclosure may likewise be utilized external to handwriting, for example in optical character recognition, object detection, and computer vision generally.

Figure 2:
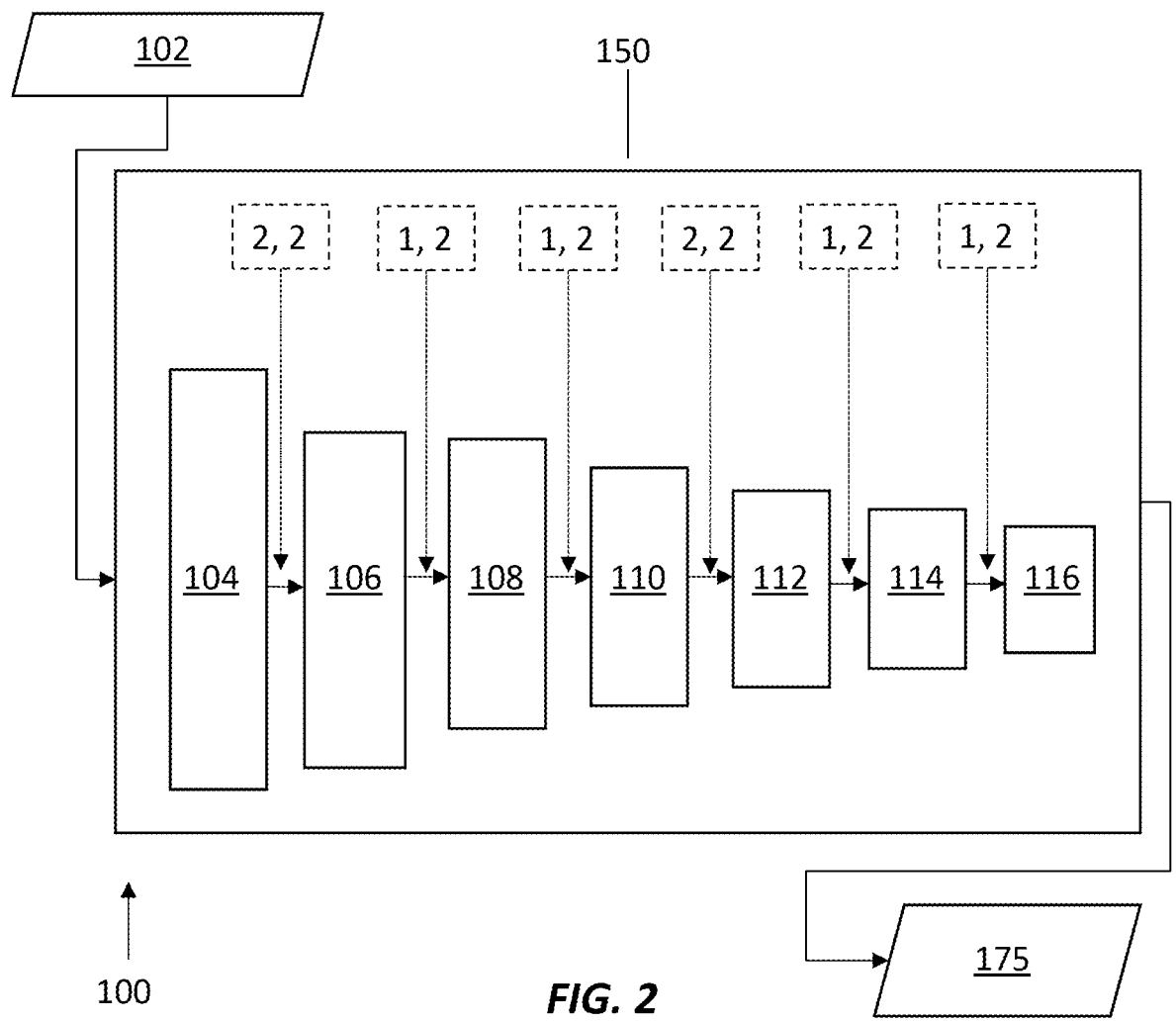
FIG. 2 is a diagram of a network for a handwriting recognition model according to an embodiment of the disclosure.

FIG. 2 is a diagram of a network 100 of a handwriting recognition model according to an embodiment. The network 100 includes a CNN 150 comprising one or more convolution layers that act as feature maps and configured to receive an input image 102. The input image 102 may have any suitable size. In embodiments, the input image 102 has a size of 32×256. A max pooling layer is arranged or interlaced after every two convolution layers to reduce computation costs and avoid overfitting. In embodiments, a max pooling layer or any other suitable layer (such as an average pooling layer) is arranged between each convolution layer, after every two layers, or in any other suitable arrangement. Each convolution layer may be followed by a ReLU as an activation function and a batch normalization layer.

As seen in FIG. 2, the CNN 150 may comprise 14 convolution layers grouped in twos 104, 106, 108, 110, 112, 114, 116. That is, each of 104, 106, 108, 110, 112, 114, 116 represents two convolution layers with a corresponding feature map. Each of 104, 106, 108, 110, 112, 114, 116 is followed by a ReLU and batch normalization, in embodiments. In embodiments where a 32×256 input image 102 is received by the CNN 150, for example, the first pair of convolution layers 104 is configured to perform or extract 32 features, the second pair of convolution layers 106 is configured to perform or extract 64 features, the third and fourth pairs of convolution layers 108 are configured to perform or extract 128 features, and the fifth, sixth, and seventh pairs of convolution layers 112, 114, 116 are configured to perform or extract 256 features. These dimensions are merely exemplary, and other dimensions, numbers of features, and/or arrangements of layers and other components are envisioned.

Additionally, the pool sizes of max-pooling layers between the pairs of convolution layers are shown between the pairs of convolution layers. For instance, between the first and second pairs of convolution layers 104, 106, a max-pooling layer with a size 2, 2 (e.g. MaxPooling2D) is arranged, whereas between the pairs 106 and 108, a max-pooling layer with a size 1, 2 is arranged, and so on. The CNN 150 may output a 256×8×8 embedding from or based on the 32×256 input image.

While pairs 104, 106, 108, 110, 112, 114, 116 of convolution layers for a total of 14 layers are described, and max-pooling layers are described as being interposed therebetween, this is merely exemplary and it will be appreciated that the disclosure is not limited thereto. Rather, the disclosed embodiments encompass other numbers of layers, e.g. 21 layers, arranged in any suitable manner, such as triplets of layers followed by max pooling, average pooling, or other suitable operations, such as batch normalization. Nor must the layers be arranged uniformly, but rather pairs of convolution layers may be arranged with triplets of convolution layers along with single convolution layers, with max pooling, average pooling, and/or other layers interposed therebetween, as the case may be. Further, in embodiments skip or shortcut connections between and/or to concatenate certain layers or pairs of layers may be utilized.

Figure 3:
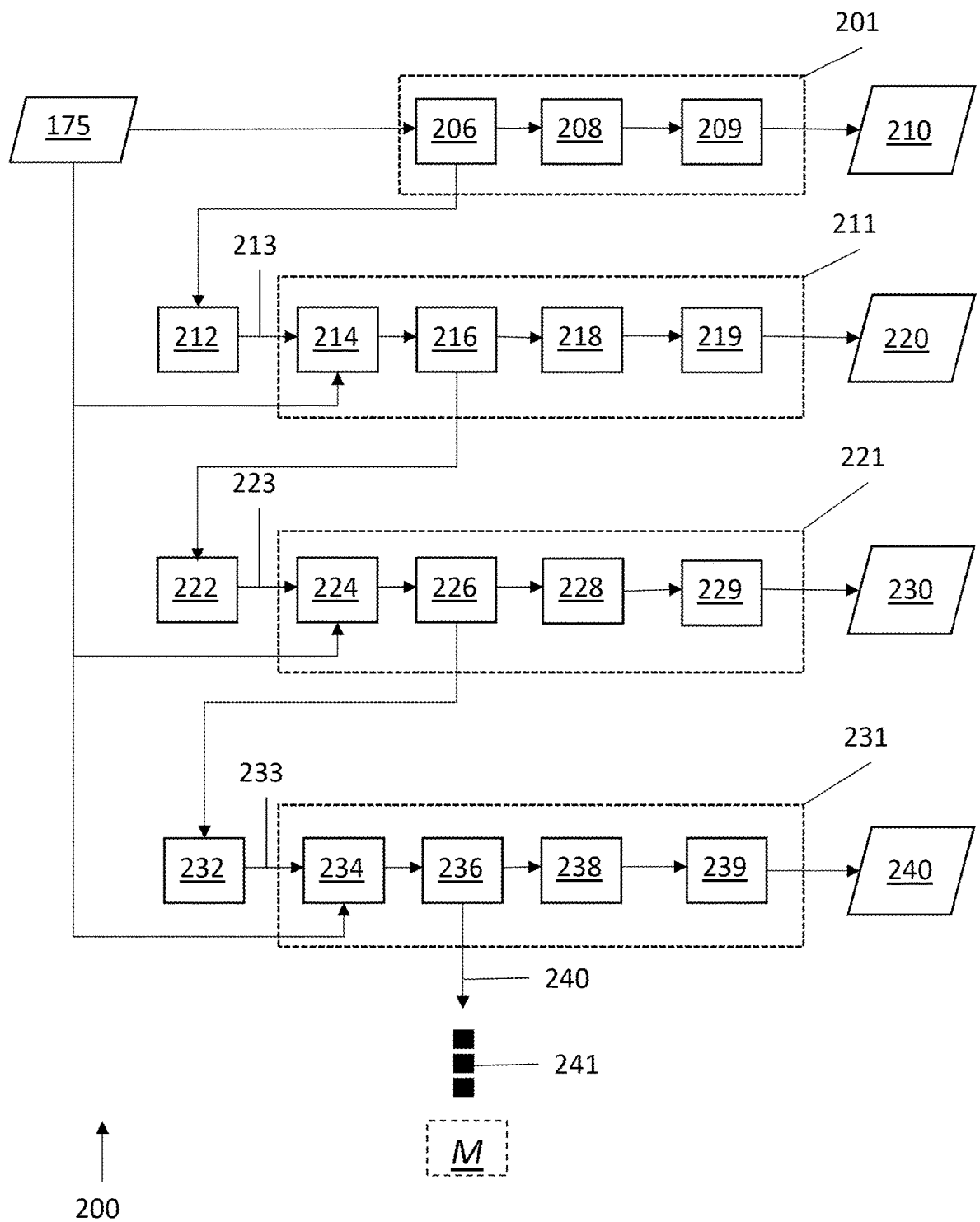
FIG. 3 is a diagram of another network for a handwriting recognition model according to an embodiment of the disclosure.

Turning to FIG. 3, a network 200 configured to generate character predictions is shown. The network 200 may be a cascade of concatenated convolution layers and dense neural network layers. The network 200 may receive the embeddings 175 from the first network 100 or may receive any suitable input from any other suitable source. The input embeddings may be or derive from architectural changes generated by, e.g., editing the number of convolutional layers and pooling layers, representational learning techniques such as neural networks including autoencoders and transformers, dimensionality reduction methods, a combination of low-level computer-vision-based feature extraction techniques, modifications or combinations thereof, or any other suitable source.

The network 200 may be configured to receive the embeddings 175 or other input and provide character(s) predictions 210, 220, 230, 240 as outputs. The network 200 may comprise one or more subnetworks 201, 211, 221, 231 configured to output a character prediction 210, 220, 230, 240 specific to a timestep and based on the input. The first input to the subnetworks 201, 211, 221, 231 may be embeddings such as the embeddings 175 generated by the first network 100, for example 256×8×8 embeddings or any other suitable dimension. In a downsampling step or module 206, 216, 226, 236, the received input may be downsampled. That is, a received input embedding of, e.g., 256×8×8 dimensions may be downsampled to a feature map having dimensions 1×8×8 using any suitable modality therefor. The downsampled feature map may be output from the downsampling step or module 206, 216, 226, 236 to a flattening step or module 208, 218, 228, 238 and/or to a convolution layer 212, 222, 232.

A second input 213, 223, 233 to the subnetworks 211, 221, 231 may be an upsampled version of a single activation-mapped convolution layer determined by a previous, i.e. upstream, subnetwork. That is, the second input 213, 223, 233 may be a 256×8×8 feature map determined using the convolution layer 212, 222, 232 based on the downsampled feature map. While the upsampled version of the single activation-mapped convolution layer 213, 223, 233 may have dimensions 256×8×8, other dimensions are contemplated. In embodiments, the dimensions must comply with 175 dimensions. The second input 213, 223, 233 may be provided with, parallel to, prior to, or subsequently to the first input embeddings 175 for each of the subnetworks 211, 221, 231, while the first subnetwork 201 receives only the embeddings 175 as input as there is no subnetwork upstream thereof.

The second, third, and fourth subnetworks 211, 221, 231 include a concatenation step or module 214, 224, 234 for concatenating the embeddings 175 and the upsampled version of the single activation-mapped layer 213, 223, 233 from the previous subnetwork. Within the subnetworks 201, 211, 221, 231, the input embeddings 175, comprising a plurality of activation maps (in an embodiment, 256 activation maps), are concatenated at 214, 224, 234 with the upsampled version of the single activation-mapped convolution layer 213, 223, 233, downsampled to a feature map at 206, 216, 226, 236, flattened to a vector at 208, 218, 228, 238, and then passed to a dense neural network 209, 219, 229, 239, comprising one or more sigmoids. At 208, 218, 228, 238, the feature map may be flattened from, e.g., a 1×8×8 feature map to a 64-element vector suitable for inputting to the corresponding dense neural network 206, 216, 226, 236.

While a concatenation step or module 214, 224, 234 is described, it will be appreciated that the present disclosure is not limited thereto, but rather may also or alternatively include a summing operation, an averaging operation, and/or any other suitable operation. The modules or steps 214, 224, 234 may vary; in an embodiment, one may perform concatenation, another may perform averaging, etc. By receiving, in embodiments, a signal from a previous timestep, the second network 200 advantageously avoids the problem of repeating characters.

The number of sigmoids in the dense neural networks 209, 219, 229, 239 may be determined by the number of characters in an alphabet to which the network 200 is applied. In an embodiment, the number of sigmoids is 26 for alphabetical characters plus 3 special characters for a total of 29 sigmoids in the dense neural network 209, 219, 229, 239. In embodiments, the dense neural network 209, 219, 229, 239 is a single-layer neural network configured to determine a probability of the vector representing one of the 29 characters corresponding to the sigmoids. A highest probability is selected and a prediction for the corresponding character 210, 220, 230, 240 is output for that timestep. The dense neural networks 209, 219, 229, 239 may be a pre-trained model(s) and/or may be trained end-to-end with the first and/or second networks 100, 200.

While four subnetworks 201, 211, 221, 231 are depicted, it will be appreciated that the network 200 may comprise or be configured to cooperate with any number and arrangement of components including subnetworks as denoted by an ellipsis 241, up to M subnetworks. The number of subnetworks M may be determined based on a number of characters in a detected word, for example 24 subnetworks in a 24-character word.

Figure 4:
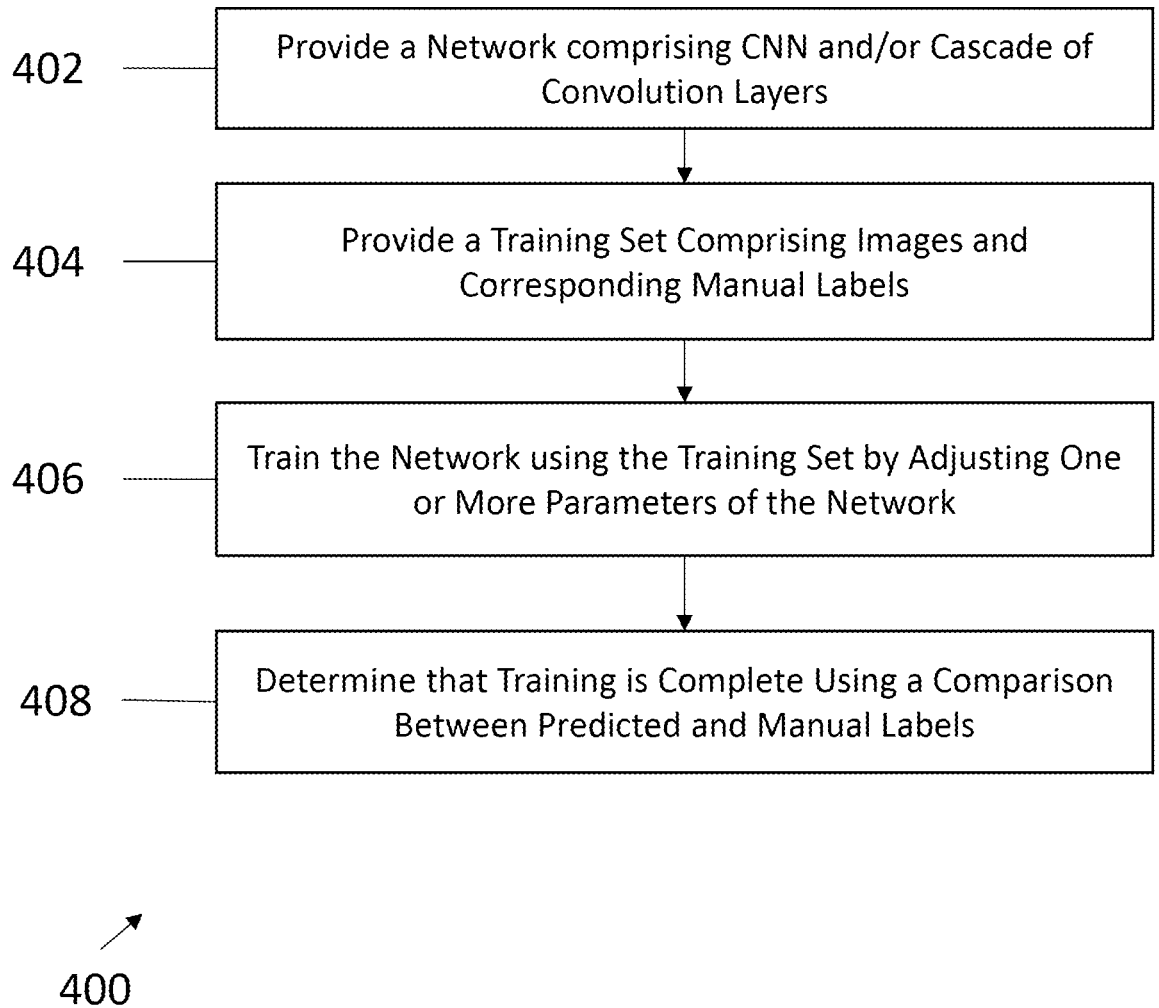
FIG. 4 is a diagram of a method for handwriting recognition according to an embodiment of the disclosure.

Turning to FIG. 4, a training method 400 for training a handwriting recognition system or model according to an embodiment of the disclosure is shown and described. The method 400 includes a step 402 of providing a network comprising at least one of a CNN optionally with max-pooling layers and a cascade of concatenated convolution layers. The method 400 includes a step 404 of providing a set of training images and corresponding manual labels, a k a ground truths, to the network provided in the step 402. The training images may include any suitable number of training images, for example approximately 106,000 images for training, approximately 30,000 images for testing/validation. The images can be obtained from any suitable source; in an embodiment, the training and testing images were obtained from the U.S. 1940 Census. The training set may also include a validation set including a suitable number of images. Augmentation of the training and/or testing images may be performed to account for variability in handwriting.

A step 404 includes training the network from the step 402 using the training set from the step 404. The training may include randomly assigning values for parameters of the network, and predicting characters from the images in the training set using the network. The predicted characters are compared against the manual labels and a loss therebetween is determined. The one or more parameters of the network are adjusted, and comparisons repeated for any suitable number Dof epochs. A step 406 includes determining that the training is complete using a comparison between the predicted and manual labels, for example when the loss therebetween falls below a predetermined threshold. A validation training set may be used for determining that training is complete prior to inference.

In contrast to LSTM with attention and Transformer networks, which require a complex loss such as connectionist temporal classification for acceptable performance, the loss function of embodiments may utilize Binary Cross Entropy or related and/or equivalent methods. For example, other losses may include mean square error, cosine similarity, etc. This advantageously circumvents the use of a complex decoding scheme and reduces the inference time.

It has been surprisingly found that by using a handwriting recognition approach of embodiments of the present disclosure, the time for training the first and/or second networks is reduced by a substantial magnitude: LSTM-based models require two days of training, transformer-based models require three days of training, and disclosed embodiments require a maximum of 12 hours of training, a reduction of 75% and 83%, respectively.

Figure 5:
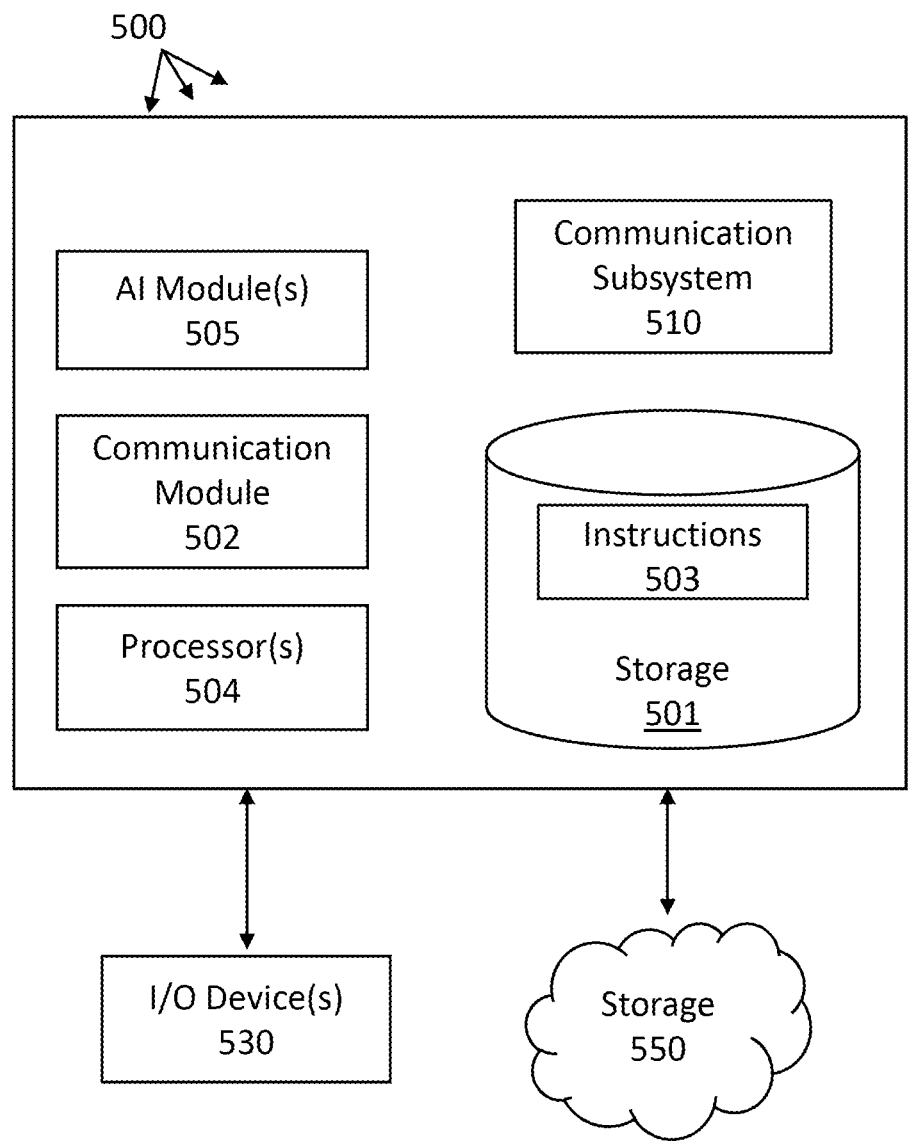
FIG. 5 is a diagram of an example computing environment for a handwriting recognition embodiment of the disclosure.

FIG. 5 illustrates an example computer system 500 comprising various hardware elements, in accordance with some embodiments of the present disclosure. The computer system 500 may be incorporated into or integrated with devices described herein and/or may be configured to perform some or all of the steps of the methods provided by various embodiments. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

In the illustrated example, the computer system 500 includes a communication module 502, one or more processor(s) 504, one or more input and/or output device(s) 530, and a storage 501 comprising instructions 503 for implementing an image enhancement system and/or method according to the disclosure. The computer system 500 may be implemented using various hardware implementations and embedded system technologies. For example, one or more elements of the computer system 500 may be implemented as a field-programmable gate array (FPGA), such as those commercially available by XILINX®, INTEL®, or LATTICE SEMICONDUCTOR®, a system-on-a-chip (SoC), an application-specific integrated circuit (ASIC), an application-specific standard product (ASSP), a microcontroller, and/or a hybrid device, such as an SoC FPGA, among other possibilities.

The various hardware elements of the computer system 500 may be communicatively coupled via the communication module 802. While the communication module 502 is illustrated as a single connection for purposes of clarity, it should be understood that the communication module 502 may include various numbers and types of communication media for transferring data between pertinent components such as hardware elements. For example, the communication module 502 may include one or more wires (e.g., conductive traces, paths, or leads on a printed circuit board (PCB) or integrated circuit (IC), microstrips, striplines, coaxial cables), one or more optical waveguides (e.g., optical fibers, strip waveguides), and/or one or more wireless connections or links (e.g., infrared wireless communication, radio communication, microwave wireless communication), among other possibilities.

In some embodiments, the communication medium 502 may include one or more buses connecting pins of the hardware elements of the computer system 500. For example, the communication medium 502 may include a bus that connects the processor(s) 504 with the storage 501, referred to as a system bus, and a bus that connects the storage 501 with the input device(s) and/or output device(s) 530, referred to as an expansion bus. The system bus may itself consist of several buses, including an address bus, a data bus, and a control bus. The address bus may carry a memory address from the processor(s) 504 to the address bus circuitry associated with the storage 501 in order for the data bus to access and carry the data contained at the memory address back to the processor(s) 504. The control bus may carry commands from the processor(s) 504 and return status signals from the storage 501. Each bus may include multiple wires for carrying multiple bits of information and each bus may support serial or parallel transmission of data.

The processor(s) 504 may include one or more central processing units (CPUs), graphics processing units (GPUs), neural network processors or accelerators, digital signal processors (DSPs), and/or other general-purpose or special-purpose processors capable of executing instructions. A CPU may take the form of a microprocessor, which may be fabricated on a single IC chip of metal-oxide-semiconductor field-effect transistor (MOSFET) construction. The processor(s) 504 may include one or more multi-core processors, in which each core may read and execute program instructions concurrently with the other cores, increasing speed for programs that support multithreading.

The input device(s) 530 may include one or more of various user input devices such as a mouse, a keyboard, a microphone, as well as various sensor input devices, such as an image capture device, a pressure sensor (e.g., barometer, tactile sensor), a temperature sensor (e.g., thermometer, thermocouple, thermistor), a movement sensor (e.g., accelerometer, gyroscope, tilt sensor), a light sensor (e.g., photodiode, photodetector, charge-coupled device), and/or the like. The input device(s) 530 may also include devices for reading and/or receiving removable storage devices or other removable media. Such removable media may include optical discs (e.g., Blu-ray discs, DVDs, CDs), memory cards (e.g., CompactFlash card, Secure Digital (SD) card, Memory Stick), floppy disks, Universal Serial Bus (USB) flash drives, external hard disk drives (HDDs) or solid-state drives (SSDs), and/or the like.

The output device(s) 530 may include one or more of various devices that convert information into human-readable form, such as without limitation a display device, a speaker, a printer, a haptic or tactile device, and/or the like. The output device(s) 530 may also include devices for writing to removable storage devices or other removable media, such as those described in reference to the input device(s). The output device(s) 530 may also include various actuators for causing physical movement of one or more components. Such actuators may be hydraulic, pneumatic, electric, and may be controlled using control signals generated by the computer system 500.

The communications subsystem 510 may include hardware components for connecting the computer system 500 to systems or devices that are located external to the computer system 500, such as over a computer network. In various embodiments, the communications subsystem 510 may include a wired communication device coupled to one or more input/output ports (e.g., a universal asynchronous receiver-transmitter (UART)), an optical communication device (e.g., an optical modem), an infrared communication device, a radio communication device (e.g., a wireless network interface controller, a BLUETOOTH® device, an IEEE 502.11 device, a Wi-Fi device, a Wi-Max device, a cellular device), combinations thereof, or other suitable possibilities.

The storage 501 may include the various data storage devices of the computer system 500. For example, the storage 501 may include various types of computer memory with various response times and capacities, from faster response times and lower capacity memory, such as processor registers and caches (e.g., L0, L1, L2), to medium response time and medium capacity memory, such as random-access memory (RAM), to lower response times and lower capacity memory, such as solid-state drives and hard drive disks. While the processor(s) 504 and the storage 501 are illustrated as being separate elements, it should be understood that the processor(s) 504 may include varying levels of on-processor memory, such as processor registers and caches that may be utilized by a single processor or shared between multiple processors.

The storage 501 may include a main memory, which may be directly accessible by the processor(s) 504 via the memory bus of the communication module 502. For example, the processor(s) 504 may continuously read and execute instructions stored in the main memory. As such, various software elements may be loaded into the main memory so as to be read and executed by the processor(s) 504 as illustrated in FIG. 5. Typically, the main memory is volatile memory, which loses all data when power is turned off and accordingly needs power to preserve stored data.

The main memory may further include a small portion of non-volatile memory containing software (e.g., firmware, such as BIOS) that is used for reading other software stored in the storage 501 into the main memory. In some embodiments, the volatile memory of the main memory is implemented as RAM, such as dynamic random-access memory (DRAM), and the non-volatile memory of the main memory is implemented as read-only memory (ROM), such as flash memory, erasable programmable read-only memory (EPROM), or electrically erasable programmable read-only memory (EEPROM).

The computer system 500 may include software elements, shown as being currently located within the main memory, which may include an operating system, device driver(s), firmware, compilers, and/or other code, such as one or more application programs, which may include computer programs provided by various embodiments of the present disclosure. Merely by way of example, one or more steps described with respect to any methods discussed above, may be implemented as instructions 503, which are executable by the computer system 500. In one example, such instructions 503 may be received by the computer system 500 using the communications subsystem 510 (e.g., via a wireless or wired signal that carries the instructions 503), carried by the communication module 502 to the storage 501, stored within the storage 501, read into the main memory, and executed by the processor(s) 504 to perform one or more steps of the described methods.

In another example, the instructions 503 may be received by the computer system 500 using the input device(s) 530 (e.g., via a reader for removable media), carried by the communication module 502 to the storage 501, stored within the storage 501, read into the main memory, and executed by the processor(s) 504 to perform one or more steps of the described methods.

In some embodiments of the present disclosure, the instructions 503 are stored on a computer-readable storage medium (or simply computer-readable medium). Such a computer-readable medium may be a hardware storage device that, compared to transmission media or carrier waves, is "non-transitory" and may therefore be referred to as a non-transitory computer-readable medium. In some cases, the non-transitory computer-readable medium may be incorporated within the computer system 500. For example, the non-transitory computer-readable medium may be the storage 501 and/or the cloud storage 550 (as shown in FIG. 5).

In some cases, the non-transitory computer-readable medium may be separate from the computer system 500. In one example, the non-transitory computer-readable medium may be a removable medium provided to the input device(s) 530 (as shown in FIG. 5), such as those described in reference to the input device(s) 530, with the instructions 503 being read into the computer system 500 from the input device(s) 530. In another example, the non-transitory computer-readable medium may be a component of a remote electronic device, such as a mobile phone, that may wirelessly transmit a data signal that carries the instructions 503 to the computer system 500 and that is received by the communications subsystem 510 (as shown in FIG. 5).

The instructions 503 may take any suitable form to be read and/or executed by the computer system 500. For example, the instructions 503 may be source code (written in a human-readable programming language such as Java, C, C++, C#, Python), object code, assembly language, machine code, microcode, executable code, and/or the like. In one example, the instructions 503 are provided to the computer system 500 in the form of source code, and a compiler is used to translate the instructions 503 from source code to machine code, which may then be read into the main memory for execution by the processor(s) 504.

As another example, instructions 503 are provided to the computer system 500 in the form of an executable file with machine code that may immediately be read into the main memory for execution by processor(s) 504. In various examples, the instructions 503 may be provided to the computer system 500 in encrypted or unencrypted form, compressed or uncompressed form, as an installation package or an initialization for a broader software deployment, among other possibilities.

In one aspect of the present disclosure, a system (e.g., the computer system 500) is provided to perform methods in accordance with various embodiments of the present disclosure. For example, some embodiments may include a system comprising one or more processors (e.g., the processor(s) 504) that are communicatively coupled to a non-transitory computer-readable medium (e.g., the storage 501). The non-transitory computer-readable medium may have instructions (e.g., the instructions 503) stored thereon that, when executed by the one or more processors, cause the one or more processors to perform the methods or aspects thereof as described in the various embodiments.

In another aspect of the present disclosure, a computer-program product that includes instructions (e.g., instructions 503) is provided to perform methods in accordance with various embodiments of the present disclosure. The computer-program product may be tangibly embodied in a non-transitory computer-readable medium (e.g., the storage 501). The instructions may be configured to cause one or more processors (e.g., the processor(s) 504) to perform the methods or aspects thereof as described in the various embodiments.

In another aspect of the present disclosure, a non-transitory computer-readable medium (e.g., the storage 501) is provided. The non-transitory computer-readable medium may have instructions (e.g., instructions 503) stored thereon that, when executed by one or more processors (e.g., processor(s) 504), cause the one or more processors to perform the methods or aspects thereof as described in the various embodiments.

By providing a handwriting recognition system, method, and/or computer-program product, the problem of existing modalities for text and handwriting recognition being costly, inefficient, and inaccurate are addressed. The disclosed embodiments advantageously provide a simplified handwriting recognition approach that achieves state of the art or better than state of the art accuracy while minimizing cost, complexity, computing resources required, and latency. In particular, it has been found that embodiments of a simplified handwriting recognition model or approach according to the disclosure achieve word accuracy on all data of 82% compared to state-of-the-art results of 52% using a CNN-LSTM-CTC model with best path decoding, 94% word accuracy when using only the first word, and 77% word accuracy for second word onwards. Phrase accuracy of 68% has been achieved using the embodiments.

The disclosed embodiments advantageously utilize a convolutional neural network utilized in tandem in embodiments with a network of cascaded convolutional layers, bypassing the requirement of existing approaches to provide a LSTM- or attention-based modality which necessarily entail complex submodules and numerous parameters.

It is to be understood that not necessarily all objects or advantages may be achieved under any embodiment of the disclosure. Those skilled in the art will recognize that the handwriting recognition system, computer program product, and/or method embodiments may be embodied or carried out, so they achieve or optimize one advantage or group of advantages as taught herein without necessarily achieving other objects or advantages as taught or suggested herein.

The skilled artisan will recognize the interchangeability of various disclosed features. Besides the variations described, other known equivalents for each feature can be mixed and matched by one of skill in this art to provide or utilize a handwriting recognition system, computer program product, and/or method under principles of the present disclosure. It will be understood by the skilled artisan that the features described may apply to other types of data, contexts, and/or models.

Although this disclosure describes certain exemplary embodiments and examples of a handwriting recognition system, computer program product, and/or method, it nevertheless will be understood by those skilled in the art that the present disclosure extends beyond the specifically disclosed embodiments to other alternative embodiments and/or uses of the disclosure and obvious modifications and equivalents thereof. It is intended that the scope of the present disclosure should not be limited by the particular disclosed embodiments described above, and may be extended to other uses, approaches, and contexts of text extraction, text recognition, image segmentation, optical character recognition, or family tree-, genealogy-, and/or genetic research.

What is claimed is:

1. A hardware storage device having stored therein computer-executable instructions that, when executed by one or more processors, cause a computing system to perform at least the following:
receive an input image comprising handwriting;
generate an embedding based on the input image using a convolutional neural network, the convolutional neural network comprising a plurality of convolution layers and one or more pooling layers; the convolutional neural network comprising a rectified linear unit after one or more of the plurality of convolution layers; and
generate one or more character predictions based on an embedding using a network comprising a cascade of concatenated convolution layers, the cascade of concatenated convolution layers comprising one or more subnetworks configured to perform at least one of:
receive the embedding,
downsample the embedding to a feature map,
flatten the feature map, and
generate a character prediction from the feature map using a dense neural network, wherein the dense neural network comprises a number of sigmoids corresponding to a number of characters in an alphabet.

2. The hardware storage device of claim 1, wherein a pooling layer of the one or more pooling layers is a max-pooling layer arranged after two consecutive convolution layers of the plurality of convolution layers.

3. The hardware storage device of claim 1, wherein the plurality of convolutional layers comprises a plurality of groups of two convolutional layers, wherein each group of the plurality of groups of two convolutional layers corresponds to one of a plurality of feature maps.

4. The hardware storage device of claim 1, wherein a number of the one or more subnetworks of the cascade of concatenated convolution layers corresponds to a number of characters in the input image.

5. The hardware storage device of claim 1, wherein the one or more pooling layers are interposed after every two consecutive convolution layers of the plurality of convolution layers.

6. The hardware storage device of claim 1, wherein the dense neural network comprises 29 sigmoids corresponding to 26 letters of athe Roman alphabet and 3 special characters.

7. The hardware storage device of claim 1, wherein each of the subnetworks except for a first subnetwork of the one or more subnetworks is further configured to receive as a second input an upsampled version of a single activation-mapped convolution layer.

8. The hardware storage device of claim 7, wherein the upsampled version of a single activation-mapped convolution layer is generated using a convolution layer and based on the downsampled feature map.

9. A computer-implemented method comprising:
receiving an input image comprising handwriting;
generating an embedding based on the input image using first network comprising a convolutional neural network, the convolutional neural network comprising a plurality of convolution layers and one or more pooling layers; the convolutional neural network comprising a rectified linear unit after one or more of the plurality of convolution layers; and
generating one or more character predictions based on an embedding using a network comprising a cascade of concatenated convolution layers comprising one or more subnetworks configured to perform at least one of:
receiving the embedding,
downsampling the embedding to a feature map,
flattening the feature map, and
generating a character prediction from the feature map using a dense neural network, wherein the dense neural network comprises a number of sigmoids corresponding to a number of characters in an alphabet.

10. The computer-implemented method of claim 9, wherein the plurality of convolutional layers comprises a plurality of groups of two convolutional layers, wherein each group of the plurality of groups of two convolutional layers corresponds to one of a plurality of feature maps.

11. The computer-implemented method of claim 9, wherein the first network and the network comprising the cascade of concatenated convolution layers are trained by:
providing a training set comprising one or more handwriting images and corresponding manual labels to the first network and the network comprising the cascade of concatenated convolution layers;
generating character predictions using the first network and the network comprising the cascade of concatenated convolution layers and based on the one or more handwriting images;
comparing the generated character predictions to the corresponding manual labels;
and adjusting one or more parameters of at least one of the first network and the network comprising the cascade of concatenated convolution layers based on the comparison.

12. The computer-implemented method of claim 9, wherein a pooling layer of the one or more pooling layers is a max-pooling layer arranged after two consecutive convolution layers of the plurality of convolution layers of the convolutional neural network.

13. The computer-implemented method of claim 9, wherein each of the subnetworks except for a first subnetwork of the one or more subnetworks is further configured to receive as a second input an upsampled version of a single activation-mapped convolution layer generated using a convolution layer and based on the downsampled feature map.

14. The computer-implemented method of claim 13, wherein the input and the second input are concatenated prior to downsampling.

15. A system comprising:
one or more processors; and
one or more hardware storage devices having stored thereon computer-executable instructions that, when executed by the one or more processors, configure the system to perform at least the following:
receive an input image comprising handwriting;
generate an embedding based on the input image using first network comprising a convolutional neural network, the convolutional neural network comprising a plurality of convolution layers and one or more pooling layers; the convolutional neural network comprising a rectified linear unit after one or more of the plurality of convolution layers; and
generate one or more character predictions based on the embedding using a second network comprising a cascade of concatenated convolution layers, the cascade of concatenated convolution layers comprising one or more subnetworks configured to perform at least one of:
receive the embedding as an input,
downsample the embedding to a feature map,
flatten the feature map to a vector, and
generate a character prediction from the vector using a dense neural network, wherein the dense neural network comprises a number a sigmoids corresponding to a number of characters in an alphabet.

16. The system of claim 15, wherein at least one subnetwork of the one or more subnetworks is configured to receive a second input comprising an upsampled version of a feature map from an upstream network, the upsampled version of the feature map generated using a convolutional layer.

17. The system of claim 16, wherein the at least one subnetwork is configured to concatenate the input and the second input.

18. The system of claim 15, wherein the plurality of convolutional layers comprises a plurality of groups of two convolutional layers, wherein each group of the plurality of groups of two convolutional layers corresponds to one of a plurality of feature maps.

19. The system of claim 15, wherein generating a character prediction using the dense neural network comprises determining a probability for each sigmoid of a plurality of sigmoids of the dense neural network and outputting a character corresponding to a highest probability.

20. The system of claim 15, wherein the feature map is a single-channel feature map.

* * * * *